United States Patent [19]

Wyatt et al.

[11] Patent Number: 4,686,779

[45] Date of Patent: Aug. 18, 1987

[54] METHOD OF AND APPARATUS FOR PARTICULATE MATTER CONDITIONING

[75] Inventors: W. Gerald Wyatt, Arlington; Richard L. White, Dallas, both of Tex.; Jim Bleke, Wolcottville, Ind.

[73] Assignee: VE Holding Corp., Arlington, Tex.

[21] Appl. No.: 799,014

[22] Filed: Nov. 18, 1985

Related U.S. Application Data

[63] Continuation-in-part of Ser. No. 771,337, Aug. 30, 1985.

[51] Int. Cl.[4] .............................................. F26B 17/14
[52] U.S. Cl. ........................................ 34/168; 34/173
[58] Field of Search ...................... 34/22, 25, 33, 168, 34/171, 173, 178

[56] References Cited

U.S. PATENT DOCUMENTS

| | | |
|---|---|---|
| 1,035,302 | 8/1912 | Bauer . |
| 1,174,721 | 3/1916 | Henson . |
| 1,185,622 | 6/1916 | Boss . |
| 1,574,210 | 2/1926 | Spaulding . |
| 1,750,839 | 7/1929 | Furbish . |
| 2,647,370 | 8/1953 | Miller . |
| 3,058,235 | 7/1957 | Morris et al. . |
| 3,075,298 | 1/1963 | Schaub .................................. 34/173 |
| 3,204,629 | 9/1965 | Newton, Jr. . |
| 3,526,969 | 9/1970 | Alms et al. ............................. 34/56 |
| 4,024,288 | 5/1977 | Witte . |
| 4,077,841 | 3/1978 | Suprunov et al. ..................... 34/173 |
| 4,211,071 | 7/1980 | Wyatt . |
| 4,249,909 | 2/1981 | Comolli . |
| 4,275,708 | 6/1981 | Wood . |
| 4,288,978 | 9/1981 | Wyatt ................................. 60/39.05 |
| 4,520,761 | 6/1985 | Arnold . |
| 4,574,775 | 3/1986 | Lutzen et al. . |
| 4,589,215 | 5/1986 | Iwasaki et al. ........................ 34/183 |

Primary Examiner—Larry I. Schwartz
Attorney, Agent, or Firm—Stanley R. Moore; Thomas L. Cantrell

[57] ABSTRACT

A conditioning system for particulate matter comprising a vertical conditioning vessel adapted for the counter-current flow of particulate matter and treatment fluid therethrough. The particulate matter such as grain, is fed into an upper region of the vertical vessel while treatment fluid such as steam and non-condensible gases is fed into a lower region of the vessel. A plurality of paddles adapted for rotation through the counter-current flow of particulate matter and treatment fluid are provided among a plurality of stators. The rotation of the paddles about the stators creates a plurality of notional mixture planes facilitating homogenous interaction between the treatment fluid and the particulate matter thereby providing control of temperature and/or moisture levels therein. In this manner, heat may be added to particulate matter such as grain to alter the molecular structure thereof and/or increase lubricity for subsequent operations such as pelletizing.

21 Claims, 4 Drawing Figures

METHOD OF AND APPARATUS FOR PARTICULATE MATTER CONDITIONING

BACKGROUND OF THE INVENTION

The present application is a continuation-in-part of U.S. Pat. Ser. No. 771,337 filed Aug. 30, 1985.

FIELD OF THE INVENTION

The present invention relates to apparatus for conditioning particulate matter and, more particularly, to a temperature and/or moisture conditioning system for homogeneously treating particles such as ground grain and minerals in a vertical configuration prior to compression and extrusion.

HISTORY OF THE PRIOR ART

Conditioning of matter, as referred to herein, comprises the broad step of exposing matter to a treatment fluid. The matter may be a composition of animal, mineral and/or vegetable products. The treatment fluid may be comprised of steam or gases and/or combinations thereof adapted for heating or cooling or moisturizing or drying and/or combinations thereof. In many instances the treatment fluid provides heat to the matter, which is usually in a particulate configuration, to either alter the molecular structure thereof or to increase lubricity of the particulate matter for subsequent operations such as compression and extrusion. Heat from the treatment fluid is therein a source of energy in lieu of electrical horsepower which would otherwise be expended. Moisture generated in the particulate matter or deposited thereon by the treatment fluid then serves as a lubricant. These considerations have had wide spread implications in the conditioning of matter throughout the prior art.

Examples of the above include conditioning systems for cooking and/or the heating and moisturizing of particulate matter such as grain prior to pelletizing. The prior art is replete with such systems. Many of these processes incorporate horizontal steam conditioning vessels and direct boiler steam exchange therein. Usually, the flow volumes and retention times of the particulate matter passage and steam are the most critical operational parameters. Contact is generally made in a random fashion between the particles to be heated and boiler steam within the horizontal steam chambers. In the case of commercial grain treatment, steam from boilers is usually vented into the steam vessels through which various types of grain and microingredients are forced to travel. Steam injected into the vessel condenses on the grain for heating and moisturizing it to preselect conditions. Problems have arisen in the areas of proper cooking temperature, retention time, homogeneity in treatment, as well as the steam generation itself. This is also true for the conditioning of particulate matter comprised of animal, mineral and/or vegetable products prior to compression and extrusion processes such as pelletization.

The prior art of steam vessels for both organic and inorganic material extends into technological antiquity with steam utilized for heating tobacco leaves, grain, flour, vitamins and animal feed for a multiplicity of purposes. As stated above, grain used as animal feed is often treated with steam to improve its digestibility by the animal as well as food value prior to pelletizing, or the like. Pelletizing is incorporated for various forms of particulate matter in addition to vegetable products for several reasons including the handling, storing and transporting of the substances involved. Pelletizing prevents microingredients from settling or "blowing away" and inhibits stratification typical of density variations in animal, mineral and vegetable compositions.

Steam is usually needed to heat and/or moisturize the particulate matter prior to compression and extrusion. This is particularly true of grain ground for cooking and pelletizing. It is therein heated and the moisture level adjusted to preselect parameters which facilitate pelletizing. Generally, the grain coming to the system is ground, mixed with vitamins and minerals and is relatively dry. The composition often has between eleven and twelve percent moisture at ambient temperatures. Dry and cool mixtures require more energy during the pelletizing phase and energy consumption is, of course, critical to effective operation.

Conventional steam system conditioning equipment raises the moisture level of the mixture and the temperature of the ground grain composition as close as possible to approximately 190° F. This improves established digestibility characteristics such as starch availability as well as subsequent pelletizing steps which require select heat and moisture levels. It is, of course, necessary to assure that none of the grain gets so hot so as to scorch it or break down the vitamin additives usually found in the "dust" or microingredients of the particles. It is also important that the grain not become too wet. Unfortunately with live steam, and horizontal transfer systems, the maximum practical grain temperature rise that can be produced by a direct boiler system without producing a wet product is approximately 120° F. An adequate boiler can thus produce 200° F. grain only when the incoming grain is at or above 80° F. At other times, and particularly in the winter, grain temperature of about 160° F. to 180° F. is the maximum. The amount of energy necessary to generate such quantities of steam are also of major concern. Likewise, the retention time of this grain/steam exposure is critical and in horizontal systems, cascades of horizontal units are often needed.

Other prior art grain treatment systems have addressed the need for moisture control prior to pelletizing, flaking or similar processing with apparatus which introduces steam and air in combination. For example, U.S. Pat. No. 1,185,622 to Boss teaches a 1916 process of conditioning food forming substances. The Boss patent sets forth the moisture treatment of grain or the like in such a manner that it is hydroscopically conditioned by either adding or taking moisture from such particulate matter. These systems are useful in preparing the grain to a condition where it is uniformly hydrous in its character as is necessary for efficient pelletizing. Such product is more uniformly and efficiently pelletized and ultimately digested in given quantities, in shorter time and with greater nutritive and body building effect. For example, the "microingredients" containing much of the vitamins content cannot be lost during processing. It has thus been a goal in the prior art grain condition technology to provide a treating "fluid" and system therefor capable of delivering or withdrawing moisture or other substance to or from the material to be acted upon for swelling or shrinking or wetting or drying the material as needed. To affect this end result, air and steam have been utilized in various heating and flowing configurations such as that initially shown in the Boss patent. This prior art does not envision heating the grain to a controlled higher temperature or moisture level so as to process it for better pelletizing. More importantly, it does not envision the functional problems of handling the grain efficiently for pelletizing operations necessary for a multitude of grain uses throughout the world.

More advanced prior art grain treatment technology in steaming systems have generally included refinements on the age old principle of simple steam moisturizing prior to processing. For example, U.S. Pat. No. 1,574,210 to Spaulding teaches a method and apparatus for steaming grain and the like. A vertical steam chest is thus taught. The Spaulding steam chest utilizes gravity descent and angularly disposed baffles for deflecting the grain. Steam supply ports are provided for the steaming operation of the grain during its descent. A prior U.S. patent issued to Henson under U.S. Pat. No. 1,174,721 sets forth an improved method of supplying moisture to grain and the like by utilizing the flow of steam and air heated by said steam prior to entry into a treatment chamber. Moisture is added to the grain by introducing steam with the air prior to entry into the treatment chamber. The Henson patent further teaches the use of a hygrometer to determine the moisture content of the air. Grain which is fed into the interior of the mixing treatment chamber comes in contact with the vapor which tends to condense thereupon. In this manner, the amount of moisture deposited in the substance passing through the treatment chamber may be calculated from the data given. Such a system will also work with raw steam being used instead of the mixture of steam and air. This is not always the case with horizontal steam vessels wherein noncondensible air or gases can create "short circuiting" flow paths above the processed grain to greatly reduce operational efficiency.

These prior art steam systems have been shown to be effective for removing or adding moisture to various types of grain in certain flow configurations. Unfortunately, many problems exist in prepelletizing systems utilizing boiler steam. Nonuniform flow, unequal heating, and limited retention time are critical to proper conditioning of grain mash prior to pelletizing. This is also true of many compositions of particulate matter including animal, mineral and vegetable combinations. The degree of heat and moisture contributed to the grain and microingredients is also generally hard to control and/or define in any empirical manner short of raw data measurements such as that discussed above. Conventional prior art systems simply do not effectively prevent loss of microingredients or envision control of heat added to the particles or the time in which the conditioned substance is exposed to the steam heat, as discussed below.

Aside from steam chest systems, advancements in conditioning technology has addressed the issue of control of various aspects of the steam itself. These aspects include both the adding of moisture to particulate matter and control of the microingredients mixture therein. Steam therein serves as a source of energy and may act as a binding agent when properly utilized. For example, U.S. Pat. No. 4,024,288 issued to Witte illustrates a method of treating particulate matter for conditioning oil containing vegetable raw materials. In the Witte patent, air and steam are utilized for the treatment of the raw material. Since air is a non-condensible in such systems, certain problems may arise. The utilization of super-heated steam coming from a heat exchanger which is then mixed with air is set forth and shown in the Witte reference and discloses an effective means for immersing the raw material into a steam and hot air bath. Material leaving the bath is then dried by air issuing from a hot air heat exchanger. While effective in heating by means of steam, Witte maintains little control over the temperature to which the raw material is heated and requires two separate fluid streams to attain the desired temperature and moisture levels. This system is not particularly adapted for addressing the "functional" problems set forth above.

U.S. Pat. No. 4,249,909 issued to Comolli is yet another technological advancement which sets forth a staged process for drying wet carbonaceous material. The staged drying procedure permits wicking up of hydrocarbons contained in coal to seal the surface of dried coal products sufficient to prevent appreciable reabsorption of moisture and consequent heating and spontaneous ignition. The Comolli procedure was developed for this particular application and in so doing manifested the advances made in the state of the art in steam treatment systems. These advances may be seen in part in the efforts to define and control various parameters of steam such as partial pressures. The pressures exerted by each constituent alone in the volume of a mixture at the temperature of the mixture are called partial pressures. The partial pressure is directly related to the mole fraction of a constituent present in a mixture and the total pressure thereof. However, to control partial pressure it is necessary to provide an adequate treatment chamber which evenly distributes and conditions the particulate matter passing therethrough. These aspects are set forth above and comprise the critical difference between acceptable and unacceptable conditioning systems.

It may thus be seen that the temperature treatment of particulate matter such as grain usually with steam, has been an area of marked technological evolution through the years. The advantages of steam as a moisturizing and heating medium for animals, minerals, vegetables and food stuffs may likewise be useful if the end product can be selectively controlled. Conventional treatment processes for cellular matter such as grain generally use raw steam as a sole element of a heating medium or in combination with air or similar non-condensible gases for the moisturizing process. As stated above, such processes are typically incapable of effectively treating the grain in the precise manner necessary for maximum effectiveness prior to pelletizing. For example, specific moisture levels, heat absorption and final grain temperatures must be obtained in a uniform fashion for reliable and effective pelletizing.

Reasons for the inability of conventional apparatus to meet such demands of the market are due to their inability to evenly and homogeneously process a given quantity of grain or other particulate compositions whereby each section of matter is treated for an equal time to a select condition with a minimum of energy consumption. Energy consumption is, of course, critical and the addition of heat or kinetic energy is controlling relative to operational feasibility. In many instances the particulate matter must be mixed, such as in the blending of various types of grain and feed additives. There are several basic mechanisms by which such particles are mixed. Motions which increase mobility of the particles promote diffusive mixing which can lead to homogeneity. Machines affording such results include tumblers, ribbon mixers, vertical screw mixers, muller mixers, single and twin rotor mixers. Mixing units are thus necessary for homogeneous conditioning of matter when a treatment fluid is utilized. Mixing of grain and treatment fluids such as steam generally occurs in a horizontal mode in prior art configurations. This configuration results in the consumption of great quantities of energy. The problem is due to the weight and resistance of the grain when mixed with conventional steam or the like. Another problem is the homogeneity of the mixture. For example, steam from direct fired vapor generators used in grain treatment include flue gases, which in a horizontal vessel configuration, will create "short circuit" flow paths, reducing effectiveness, encouraging particulate redistribution and ultimately energy loss and non-homogeneous conditioning.

Most conventional prepelletizing treatment systems incorporate one or more horizontal bins wherein particulate matter passes. Steam pipes are inserted into the bins and steam discharged therefrom is utilized to heat and moisturize the particles passing therethrough. Unfortunately, the volume of particle passage within the bin and the ultimate conditioning thereof is limited as discussed above. The steam treatment vessel is thus an integral element of appropriate pre-pelletizing processing and conventional technology has generally not addressed appropriate steam or particulate matter flow controls therethrough.

It would be an advantage therefor to overcome the problems of the prior art by providing a system for select temperature and/or moisture conditioning of particulate matter such as grain by an effective heating medium injected into a processing vessel which uniformly carries particulate compositions therethrough. The system of the present invention affords such an operation by utilizing a vapor generator, or the like, in conjunction with an upstanding vessel having discharge means disposed therein for uniformly passing particulate matter therethrough with a series of rotating paddles establishing notional mixing planes. The amount of heat and/or moisture supplied to the matter may therein be controlled by the rate of fuel burning of the vapor generator or by pressurization, while the retention time may be controlled by the time in which the composition is allowed to pass through the vessel and the various mixing planes. Conditioning can thus be completed with less energy expended and with containment of valuable microingredients.

SUMMARY OF THE INVENTION

The present invention pertains to particulate matter treatment systems incorporating a vertical processing vessel. More particularly, one aspect of the invention includes an improved particulate matter treatment system for the conditioning of particles in a vertical configuration with a treatment fluid. A vessel is provided and includes means for discharging the treatment fluid which is generally a heating medium therein. The heating medium is described herein for purposes of illustration as steam adapted to heat and moisturize the particulate matter and microingredients within the vessel. It should be noted, however, that the treatment fluid may be comprised of steam or gases and/or combinations thereof adapted for heating or cooling or moisturizing or drying and/or combinations thereof. The improvement comprises a generally vertically disposed cylindrical vessel adapted for the descending passing of particulate matter therethrough and means for injecting the treatment fluid into the vessel for ascending flow. The assembly facilitates counter-current engagement between the particulate matter and the heating medium, or steam, and the homogenous mixing thereof across a plurality of established notional mixing planes for generally uniform time periods. Means are provided for maintaining the homogeneous, generally vertical counter-current flow between the particulate matter and the steam. The means for maintaining the homogeneous flow includes a plurality of paddles extending into the vessel for rotation through the matter and a plurality of stators disposed between sections of paddles for establishing notional mixing planes. This configuration provides a homogeneous mixture between the ascending and descending elements. Means are also provided for sealing the generally vertical vessel to substantially prevent the discharge of steam therefrom.

In another aspect, the particulate matter comprises ground grain and microingredients. The sealing means as set forth above includes a grain input airlock system disposed above the vessel for feeding grain therein while preventing the escape of steam. The sealing means further includes a grain discharge airlock for permitting the controlled discharge of grain from the vessel while substantially maintaining the presence of steam pressure therein. The surge bin further includes grain level indicating means for controlling the volume of stored grain prior to processing. The surge bin is further constructed with a lower necked region in flow communication with the vessel providing choked flow of grain between the vessel and the surge bin.

In yet another aspect, the rotating paddles are mounted to a vertical shaft mounted in the vessel with a series of stators disposed therebetween. The paddles comprise a plurality of offset blades having angulated surfaces relative to the axis of rotation of the shaft. The paddles disposed in the lower region of the vessel are angulated for propelling and fluffing grain particles upwardly against the descending flow thereof, establishing the homogeneous mixture planes, and providing means for complete uniformity of interaction with the treatment fluid. The stators facilitate said uniformity of interaction by segregating a series of paddle sections and particle motion regions thereby eliminating the propensity of vapor channeling therethrough. Without a homogeneous mixture a predefined vapor flow path can develop therethrough to substantially reduce efficiency. The upper paddle is secured to the shaft and is angulated downwardly relative to the vessel for propelling grain, dust and microingredients downwardly onto the grain flow for further maintaining the homogeneity of the grain-steam interaction. This is equally true of particulate matter compositions of animal, vegetable or mineral substances. The shaft supporting the angulated paddles is centrally disposed within the cylindrical vessel and further includes drive means disposed thereunderneath for rotating the shaft during the infusion of steam into the vessel. The stators are supported between paddle sections by vessel wall regions. The grain discharge means therein comprises an angulated flow channel coupled to a lower side region of the vessel for carrying the descending flow heated grain from the vessel outwardly and downwardly thereof. In this manner, the discharge is outboard of the drive means for the paddle shaft and further includes an airlock grain discharge system for maintaining steam pressure within the vessel.

In yet a further aspect, the invention includes the above described system in conjunction with a vapor generator for producing steam and non-condensible gases for injection into the vessel for the heating and moisturizing of the grain. This vessel further includes means for venting the non-condensible vapor generator gases from the vessel during the operation. The discharge system for non-condensible gases includes a centrifugal particle/vapor separator system coupled in flow communication to an upper region of the vessel for receiving non-condensible gases therefrom. The separator is also coupled to the grain feed means for discharging grain and particulate matter collected from the upper region of the vessel during the operation thereof.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
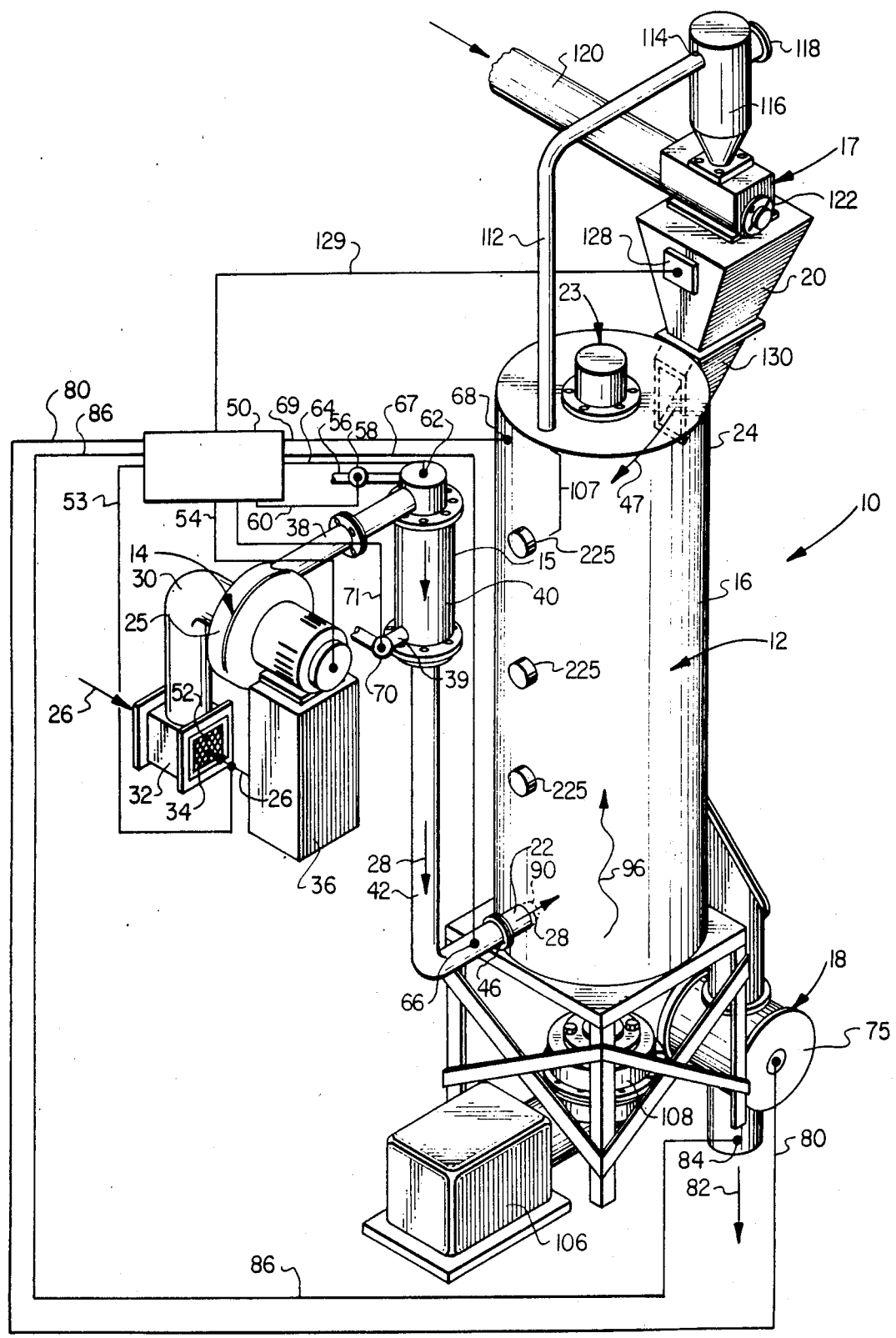
FIG. 1 is a diagrammatic, perspective view of one embodiment of the method and apparatus of the present invention illustrating the conditioning of particulate matter in a generally vertical vessel in which is injected a treatment fluid.

Referring first to FIG. 1, there is shown one embodiment of a particulate matter conditioning system 10 constructed in accordance with the principles of the present invention. The system 10 comprises a vertical treatment vessel 12 and treatment fluid generation unit 14. As set forth above, the treatment fluid can be steam or gas and/or combinations thereof. For purposes of example, the unit 14 as shown herein comprises a direct fired vapor generator for producing the aforesaid combination, to wit: steam and non-condensible gases. Vapor generators include vessels wherein fuel and oxidant are burned and water is added to the combination products for producing steam and non-condensible gases. The process vessel 12 includes a cylindrical chamber 17, upper airlock-feed system 16, and lower airlock discharge unit 18. Particulate matter such as grain, passes from an upper surge bin 20 coupled to the chamber 16 for providing continuous matter flow. The particulate matter is exposed to vapor discharge therein through conduit 22 positioned along side wall 24 of the chamber 16. A rotor, or paddle system 23 is incorporated with a stator system 223 to establish a plurality of notional mixing planes, of the vapor and the particulate matter. This eliminates defined steam channels and maintains homogeneity of the grain, steam, and non-condensible gas mixture. With the system shown herein select heating and liquid constituent control of particulate matter such as grain prior to pelletizing may be provided. The results are provided in this instance by a treatment fluid comprising a mixture of condensible and non-condensible gases produced by the unit 14. Such temperature conditioning has been shown to be both cost effective, more efficient and a more highly productive method of preparing particulate matter such as grain for compression and extrusion with less energy consumption and in a more homogenous manner.

Still referring to FIG. 1, unit 14 as shown herein comprises a direct fired, vapor generator unit 15 and blower 25. The vapor generator 15 provides a myriad of advantages as discussed below. Input to the vapor generator 15 is supplied by the blower or compressor 25 wherein intake air 26 is heated in the generator 15 and mixed with steam and non-condensibles generated thereby. The unit 14 discharges a hot-gas stream 28 through conduit 22. The air 26 is drawn into the compressor 25 through filter screen 34 covering intake manifold 32 and vectored through intake pipe 30. The blower 25 is mounted upon a support chassis 36 which may also support the related elements of the steam generation unit 14. The blower is then coupled to the vapor generator 15 through an air discharge conduit 38. Air entering the vapor generator 15 supplies the oxidant for combustion occurring therein, which combustion produces heat for raising the temperature of water supplied therein above the vaporization phase in the production of steam. The water supply conduit 39 is thus shown coupled to the body 40 of the vapor generator 15. The water is vaporized by said combustion and discharged through exhaust conduit 42 upstream of discharge conduit 22 coupled thereto by coupling flange 46.

The operation of the vapor generator 12 as shown in FIG. 1, is preferably effected in accordance with the vapor generator set forth and shown in copending patent application Ser. Nos. 589,260 and 766,640, assigned to the assignee of the present invention. In these vapor generator systems, a stoichiometric mixture produces substantially pure exhaust of steam and non-condensible gases comprising a hot gas mixture capable of effective operation in accordance with the principles of the present invention. As said mixture of steam and non-condensibles passes through the chamber 16, particulate matter such as grain 47 and microingredients loaded through the surge bin 20 and upper region thereof are effectively heated and moisturized for improving the food value thereof and preparing said mixture for compression, extrusion and/or pelletization. The heated grain and added substances pass through the chamber 16 and are discharged through the airlock discharge unit 18 coupled therebeneath for effecting homogeneous moisture and heat treatment. In this manner the grain and microingredients are effectively treated with steam and non-condensible gases 28 in a manner both economically efficient and production wise effective. By controlling both the travel of the grain 47 across a plurality of notional mixture planes within the chamber 16 as well as the mixing ratios and combustion parameters of the vapor generator 15, an extremely homogeneous treatment system is provided with cooking temperatures, pressures and moisture level selectively controllable as will be described below.

Referring still to FIG. 1, a control unit 50 is provided for integrating temperature readings of the various processing fluids as well as the particulate matter 47 and controlling the operation of the system 10 in accordance with the principles of the present invention. Temperature sensor 52 is thus disposed in the air intake manifold 32 and coupled to control unit 50 by sensor line 53. Likewise operation of the blower or compressor 25 is controlled by control line 54 coupled to the control unit 50. Fuel is provided to the vapor generator 15 by fuel line 56 regulated by control valve 58 coupled to control unit 50 by control line 60. Performance parameters of the vapor generator 12 are monitored by sensor array 62 coupled to control unit 50 by control line 64.

Temperature discharge medium 28 is monitored by sensor 66 disposed in conduit 42 and coupled to control unit 50 by sensor line 67. Temperature of the particulate matter such as grain 47 is likewise monitored by sensor 68 coupled to control unit 50 by sensor line 69. Water flowing through conduit 39 to vapor generator 15 is regulated by valve 70 which is controllable by control unit 50 and coupled thereto by control line 71. Grain 47 passing through chamber 16 is therefore exposed to steam and non-condensible gases 28 which have been produced by selectively controllable parameters in the upstream vapor generation unit 14 and percolate upwardly within the vessel 16 as treatment fluid 96. The length of time of travel of the grain 47 through a series of notional mixing planes within chamber 16 is therefore selectively controllable through actuation of the airlock discharge system 18. The airlock discharge system 18 of this particular embodiment is comprised of a rotating gate valve system 75 which is coupled to the control unit 50 through control line 80. Both the control and illustration of the airlock discharge system 18 of FIG. 1 is presented for purpose of illustration only. A garner system or the like as set forth in copending patent application Ser. No. 766,640, filed Aug. 15, 1985 and assigned to the assignee of the present invention may also be used herewith. Finally, the temperature of the discharged grain 82 may be monitored by a sensor 84 positioned beneath the airlock discharge unit 18 which is coupled to the control unit 50 by sensor line 86. In this manner, the control unit 50 may be used to monitor and control the operation of system 10 in accordance with the principles of the present invention.

Figure 2:
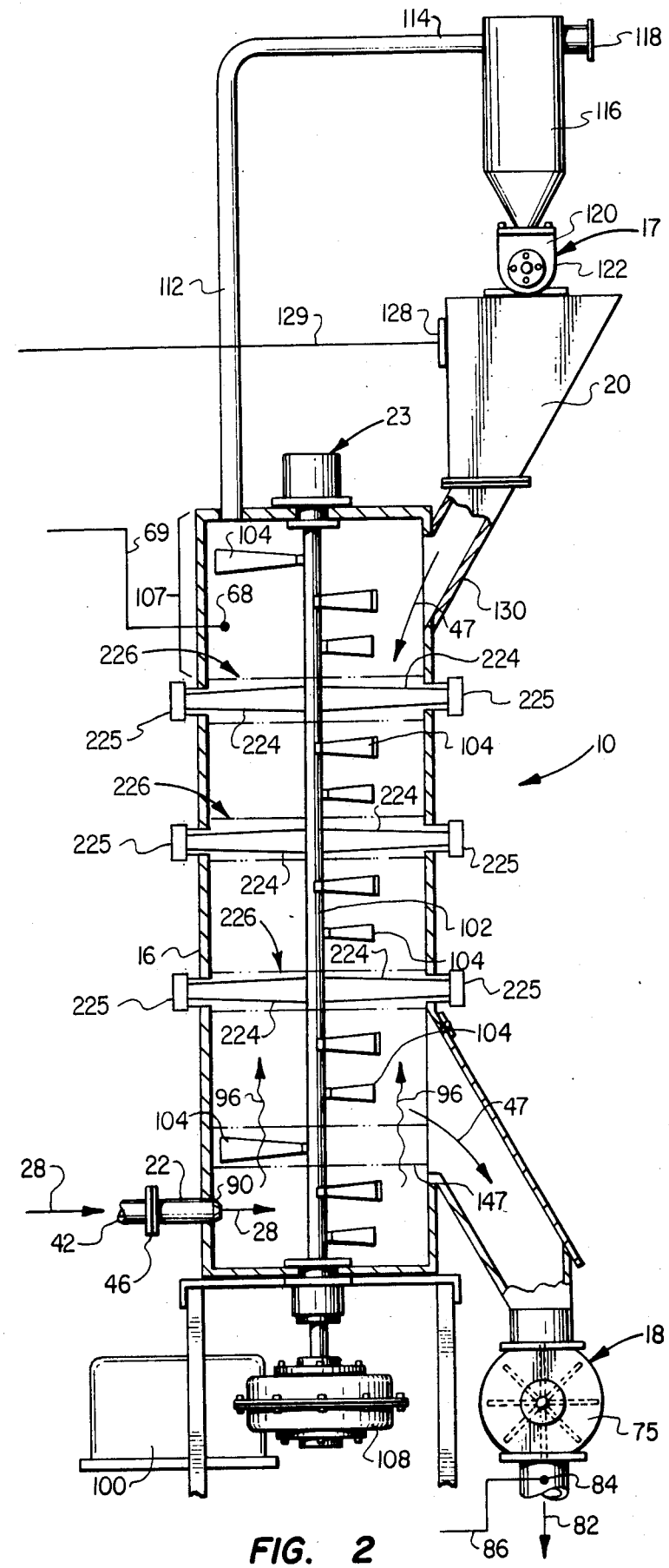
FIG. 2 is a side-elevational cross-sectional view of the vessel of FIG. 1.

Referring now to FIG. 2 there is shown an enlarged, side-elevational, cross-sectional view of one embodiment of a vertical, particulate matter treatment chamber 16 constructed in accordance with the principles of the present invention. It should be noted that the particular embodiment of the treatment vessel 16 shown herein is but one embodiment of said chamber and the method and apparatus of the present invention. The paddle system 23 is constructed of a paddle shaft assembly 100 comprising a central shaft 102 and a plurality of paddles 104 mounted there upon. The paddles 104 are staggered both longitudinally and rotationally one to the other and are constructed with a preselect pitch. The lower paddles 104 swirl and propel particulate matter in an upward direction while an upper paddle 104 propels vapor and matter downwardly. Rotation of the paddles 104 is provided by a motor 106 coupled to a gear box 108 disposed immediately below the shaft 102 for rotation thereof at preselect speeds. In this manner, particulate matter such as grain 47 descending through the vessel 16 may be fluffed and propelled upwardly along various notional mixing planes 147 defining the regions of rotation of the paddles 104 whereby ascending treatment fluid such as steam and non-condensible gases 96 is thoroughly and homogeneously mixed therewith.

Still referring to FIG. 2, the vessel 16 is further constructed with a stator system 223 comprising a plurality of stators 224 disposed between certain ones of said paddles 104 longitudinally therealong. Each stator 224 is secured to the side-wall of the vessel 16 by securement caps or bulkheads 225. Stators 224 are disposed diametrically opposite one another within the vessel 16 to define a notional "counter-swirl" plane 226. The notional stator planes 226 are disposed longitudinally along the vessel 16 between arrays of said paddles 104 as shown in the drawing. In this manner, the rotation and propelling of particulate matter by the paddle system 23 is divided into segments to prevent a continuous pattern of swirling particulate matter through the vessel 16. Such a condition can produce "predefined vapor paths" therethrough. This term is used to describe the condition wherein the vapor "finds" a low resistance flow path. Without stators 224 this "predefined path" is usually in the center region of the vessel 16 due to the outwardly swirling matter. This condition results in the vapor not being uniformly mixed with the particulate matter. The stator 224 in essence creates a "counter-swirl" notional plane blocking both the movement of particulate matter between discrete paddle sections propelling matter back to the center of the vessel and further inhibiting defined vapor flow paths upwardly therethrough.

In accordance with the principles of the present invention the ascending flow of vapor then homogenously interacts with the particulate matter which the stators 224 effectively accomplish. The absence of the stators 224 can, under certain circumstances and conditions, permit vortexual swirling of the particulate matter induced by the paddle system 23. When this occurs, vapor can channel upwardly throughout the vessel 16, attributing to non-homogenous interaction and conditioning as outlined above. The positioning of the stators 224 further facilitate discrete segmentizing of the fluffing and propelling of the particulate matter upwardly across the various notional mixing planes 147 defined above. The regions of rotations of the paddles 104 are thus provided in sufficiently small axial sections to maximize the inhibiting of vapor channeling between stator notional planes 226.

For purposes of example only, it should be noted that the vessel 16 may be constructed of stainless steel, or the like. In one such construction the paddle assembly 100 has been formed of fifteen separate paddle members 104, although the exact number is not controlling. In this construction of the system 10, the paddles were constructed in 24 inch lengths set at a 30° pitch for fluffing the grain upwardly. As further recited herein, the uppermost paddle 104 is preferably set with a downwardly directed pitch for forcing the particulate matter in a downward direction. As shown in the drawings, the paddles 104 are angularly offset one from the other which, in one embodiment, included a 120° offset. In this configuration a grain mash was prepared for pelletizing with the paddle system 100 installed in a vessel 16 constructed of a 10 foot height. The paddle system 100 was operated at a speed of 200 rpm and a steam pressure of 1.5 psi.

Still referring to FIG. 2, treatment fluid such as steam and non-condensible gases is injected into the chamber 16 through the conduit 22 and dispersed therein by one or more steam nozzles 90 installed in the side walls of the chamber 16. Steam nozzles 90 are but one example of steam injection means and any of a variety of steam injection manifolds or systems may be utilized. The utilization of the paddle system 100 and the fluffing action along notional planes 147 as illustrated herein facilitates the homogeneous mixture of the steam and particulate matter. As stated above, the matter may be of an animal, mineral or vegetable variety. The term "particulate" likewise refers to any of a variety of sizes including dust, microscopic particles as well as pellets, rocks and the like. This wide latitude of matter composition and size is feasible due to the vertical orientation of vessel 16 with paddle system 100 establishing a plurality of homogeneous mixing planes therein. Therefor the precise infusion of steam into the vessel 16 is not as critical as in many prior art configurations. Steam rising from nozzle 90 engages the lower most rotating paddle 104 and notional mixing plane 147 thereof to become evenly dispersed therearound. The resulting rising steam 96 continues to penetrate the numerous notional planes 147 of paddle rotation and notional planes 226 of stators 223 for homogeneous interaction with the descending particulate matter 47 in a uniform condition or pattern. Pressures and temperatures will, of course, vary with each rotational plane 147 depending on its vertical position within vessel 16. The pattern can be selected for particular components such as grain, microingredient and dust configurations. Moreover, the percolation of non-condensible gases from the vapor generator 14 upwardly through the notional planes 147 and 226 produce a medium of low resistance to rotation of the paddles 104, as the non-condensible gases displace the heavier grain 47. The presence of non-condensible gases in the treatment fluid thus reduces energy consumption which increases unit efficiency. Heat from the treatment fluid is thus added more homogeneously in the mixture planes 147 to further reduce energy consumption. Due to the construction of the airlock and discharge system 18 and the paddle system 100, ground grain, microingredients and the like passing therethrough are uniformly distributed and are not subject to agglomeration and channeling as is so prevalent in prior art steam moisturizing chambers of either vertical or horizontal configurations. The method of flow diversion and steam handling through the airlocks herein controls and effectively maximizes energy consumption relative to grain heating. Heat can thus be added to the particulate matter in the vessel 16 prior to subsequent pelletizing wherein energy consumption costs are much higher. As stated above, heat is a source of energy in lieu of electrical horsepower and can increase lubricity of the particulate matter. This is a critical step in grain conditioning because the subsequent step of pelletizing is much more efficient if the pelletized die is lubricated by moisture in the grain. Tonnage rates can drop by over 50% if the grain is not properly conditioned. Likewise, too much moisture can cause equally severe problems and thus the present invention provides means for establishing both temperature and/or moisture levels in the particulate matter prior to pelletizing.

Referring still to FIG. 2, there is shown one of the airlock discharge steam and handling systems 18 of the discharge system wherein discharge valve 75 is provided for actuation and elimination of heated and moisturized grain uniformly from the vessel 16. As stated above, a single or multiple garner system may likewise may be utilized as set forth in co-pending patent application Ser. No. 766,640. In either manner, the bulk of the steam 96 is forced to uniformly rise within the chamber 16 for exposure to an homogeneous interaction with the particulate matter, dust and microingredients passing therethrough prior to compression and extrusion operations such as pelletizing. The propelling of microingredients and dust upwardly with the steam 96 as shown herein further enhances the interaction and mixture thereof in the moisturization step. When conditioning ground grain, the microingredients and grain dust are urged to agglomerate prior to passage through discharge unit 18. Dust and/or microingredients which reach the upper most level of the chamber 16 in the upper vacinity 107 engages the upper most paddle 104 which is preferably constructed with a downwardly directed pitch for propelling the fine dust particles and microingredients downwardly into the mixture of particles 47 passing thereunder. The utilization of a downwardly deflecting paddle 104 has been shown to be abundantly useful in containing microingredients of ground grain and microingredients in prepelletizing mixtures due to the fine consistency thereof. It should be noted that the value of the pelletized mixture is contingent to a large part on the homogeneous inclusion of said microingredients due to their high vitamin content and the tendency thereof to be eliminated during many prior art steam and moisturizing processes. However, to further insure the containment of all microingredients and grain dust particles, other support systems described below are utilized herewith.

Figures 3, 4:
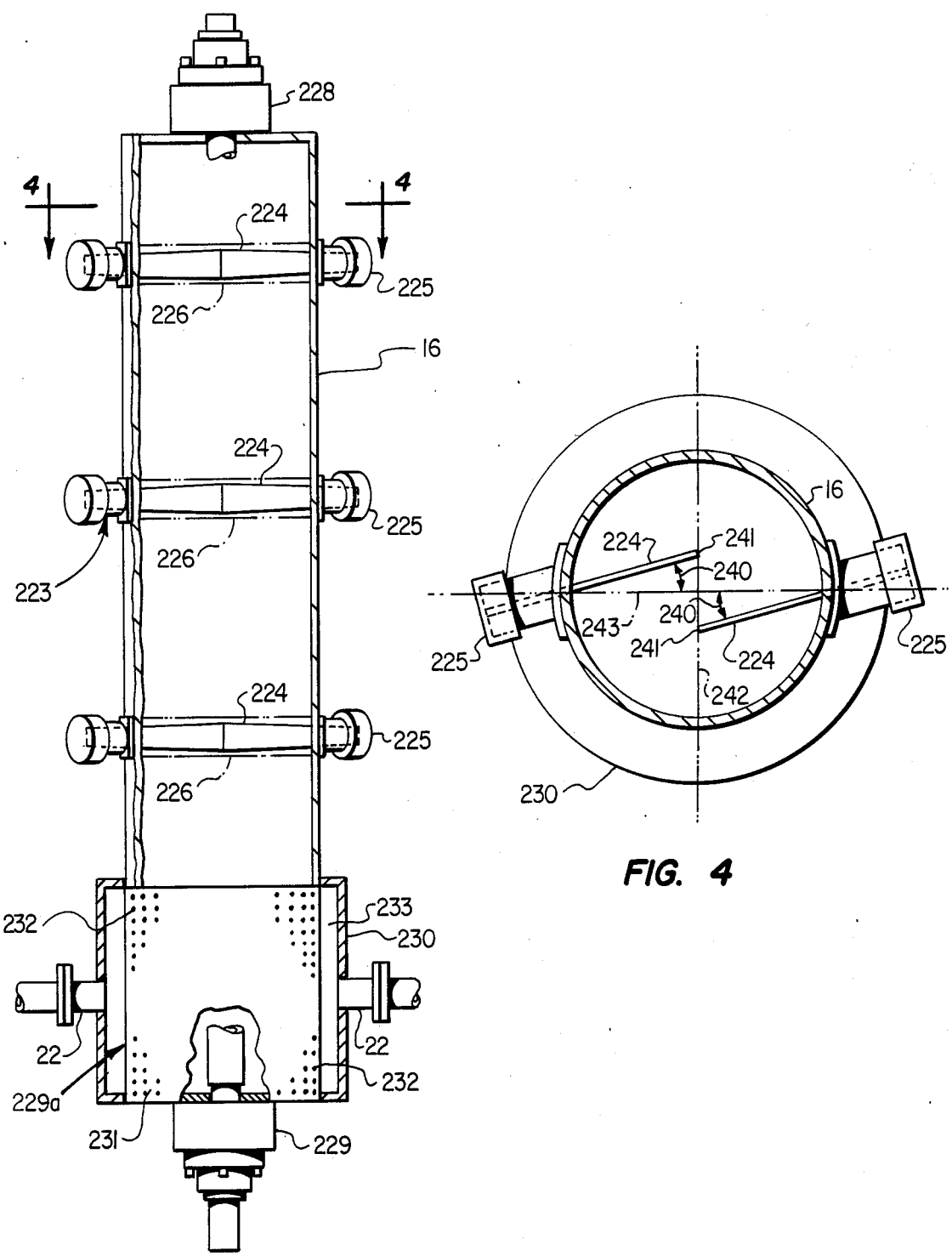
FIG. 3 is a side-elevational, cross-sectional view of an alternative embodiment of the conditioning vessel of the present invention constructed with a plurality of stators disposed therein and a vapor diffuser disposed therearound.
FIG. 4 is a top plan, cross-sectional view of the vessel of FIG. 3 taken along lines 4—4 thereof illustrating the placement of the stators therein.

Referring now to FIG. 3 there is shown a diagrammatic, side-elevational, cross-sectional view of the vessel 16 and stator system 23 of the present invention. As shown herein the paddle system 23 has been removed to more clearly illustrate the alignment and mounting of the individual stators 224. It may be seen that the stators 224 are secured to the outer walls in the vessel 16 by mounting bulk heads or caps. The caps may be welded pipe sections with threadably mounted ends to facilitate assembly. The mounting bulk heads 225 allow each stator 224 to be secured within the vessel 16 in generally parallel spaced relationship along notional plane 226. In this particular embodiment a vapor diffuser 229a is also shown in the lower region thereof. In this alternative embodiment of a method and apparatus for infusing vapor into the chamber 16, an outer cowling 230 is provided in flow communication with conduits 22 as shown in FIG. 1. The outer cowling 230 provides an annular region 233 for vapor to fill and evenly ingress into vessel 16 through a perforated diffuser plate 231. Diffuser plate 231 may be cylindrical and preferably contains a plurality of apertures 232 for allowing equal flow of vapor from annular region 233 into vessel 16 and engagement with particulate matter therein. In this particular embodiment the structural configuration for both the conduits 22, flow cowling 230 and shaft mounting members 228 and 229 are illustratively shown. Upper shaft mounting member 228 and lower shaft mounting section 229 are seen in concentric alignment relative to the vessel 16 for supporting the rotational motion of said centralized paddle system 23.

Referring now to FIG. 4 there is shown a top plan, cross-sectional view of the vessel 16 of FIG. 3 taken along lines 4—4 thereof. Stators 224 are shown to be secured outwardly of the vessel wall 16 by the fastener bulk heads 225. As stated above, one method of mounting the stators 224 is to provide a threaded pipe and head to which the stators 224 are secured by welding, or the like. In this manner, the stators 224 and fastener bulk heads 225 can be unscrewed from the pipe section and removed from the vessel 16. This allows the paddle system 23 to be lifted out of the vessel 16 for repair or installation.

Still referring to FIG. 4, each stator 224 is aligned in generally parallel spaced relationship with the stator 224 disposed on the opposite side of the vessel 16 to establish the notional mixing plane 226 thereacross. For purposes of establishing said notional plane 226, each stator 224 is mounted at an angle 240 relative to a diameter line 243 passing through the caps 225 and chamber 16. The stators 224 are of a length terminating along diameter line 242, which line 242 is generally orthogonal to diameter line 243 from which angles 240 subtend. As may further be seen in this top plan view the flow diffuser cowling 230 is disposed beneath the stators 224 in further illustration and construction thereof. It is to be understood that this is but one embodiment of a construction of a diffuser slate 231.

The utilization of stators 224 as described herein provides a very distinct advance over systems not incorporating said stators by segregating the notional planes 147 as shown in FIG. 2. These stators 224 block the swirling flow of particulate matter relative to the rotating paddles 104 above and below said stators. When the matter is blocked, it is propelled back toward the center of the vessel 16 due to the angle 240 of the stators 224. An angle on the order of 30° has been found operable and effective in counter-swirling the matter above and below the stators 224 and in preventing channeling of vapor therethrough. It should also be noted that the stators 224 can be placed between any number of paddles 104 comprising an array although only two paddles are shown in FIG. 2 between each stator 224.

The present invention is particularly adapted to the use of a vapor generator of the type wherein steam and non-condensibles or flue gases are fed into the chamber 16. These gases facilitate paddle rotation and homogeniety in the notional planes 147. However, such a system requires the discharge of the non-condensible gases which are not absorbed. A separator line 112 is thus provided for collection of said flue gases and the concommitant collection of valuable dust latent particles therein. These particles rising with the non-condensible gases which pass the upper deflector paddle 104 are collected in the separator line 112 which is secured in flow communication to the uppermost region 107 of the chamber 16. The opposite end 114 of separator line 112 is coupled in flow communication to a vortex separator unit 116, or the like, which effectively separates particles from the gas vapor flowing therethrough. The vortex separator unit 116 is of a established prior art design commonly utilized in the grain industry at various process stages thereof. The conventional vortex separator incorporates a high speed cylinder in engagement with the gaseous infusion from separator line 112 whereby particles are centrifugally contained and vectored downwardly into the grain processing system while "scrubbed" vapor is allowed to be discharged through vent 118. In the present invention, the vortex separator unit 116 is showed and mounted on top of an inlet feed screw 120, which is in sealed communication with the airlock system 122. The feed airlock system 122 as shown herein is particularly adapted for receipt of grain fed from storage bins (not shown). The grain, microingredients and dust are thus passed through airlock 122 into upper surge bin 20. The surge bin 20 is formed in a tapered configuration to facilitate flow while containing preselect levels of particulate matter such as grain 47 necessary for continuous operation and processing in the vessel 16. A bindicator 128 is mounted to the surge bin 20 providing means for indicating grain level. The bindicator 128 is likewise coupled to the control unit 50 by control line 129 as shown in FIG. 1. Infusion of grain 47 into the surge bins 20 is, thus controlled by a response to the bindicator through control system 50. Utilization of bindicators 128 and surge bins 20 is, in and of itself, conventional in the prior art. However, in the present invention the surge bin 20 further comprises a necked area 130 in the vicinity of the upper region 107 of the vessel 16. The necked region 130 provides a choke feed for the descending flow of grain 47 as well as the ascending flow of steam and noncondensibles 96. In this manner, the steam and noncondensibles 96 are forced to remain within the vessel 16 unless exhausted through separator line 112.

Referring now to FIGS. 1, 2, 3 and 4 in combination, it may be seen that the assembly of the present invention utilizes a system capable of temperature conditioning for select heating and liquid constituent control of any particulate matter present within the vessel 16. This control is effected by the homogeneous mixing of the treatment fluid and particles through the plurality of notional mixing planes 147 and 226 described above and through the control of enthalpy, partial pressure and dew point in the vessel 16. The control of enthalpy, partial pressure and dew point within vessel 16 is most clearly set forth and described in co-pending application Ser. No. 589,260, filed Mar. 13, 1984, assigned to the assignee of the present invention and incorporated herein by reference. By providing a closed system such as that shown herein with upper and lower airlocks and means for homogeneous particulate and treatment fluid flow therethrough said parameters may be controlled for maximizing the efficiency in particle conditioning. Thus homogeneous heating, cooling, moisturizing, or drying is possible with any of a variety of substances. The system 10 of the present invention affords such operation by utilizing a treatment fluid generator such as vapor generator 14, or the like, in conjunction with the conditioning vessel 16 and paddle assembly 100. With a vapor generator 14, the rate of heating is controlled by the rate of fuel burning while the moisture content and maximum temperature generated in the particulate matter can be controlled through the partial pressure of the condensible vapor and dew point within the chamber 16. The utilization of the rotating paddles 104, stators 224 and mixing planes 147 and 226 facilitate preselect homogeneity and uniform distribution of, enthalpy partial pressure and dew point therein. As stated above, these parameters vary along the vertical height of the vessel 16 and throughout the counter-current course of flow. The partial pressure and dew point are, in turn, determined by the fluid flow rates in the vapor generator and/or the introduction of extra amounts of non-condensible gas and the total pressure at which the system 10 operates. By utilizing the airlock feed and discharge system of the present invention and the feedback separator line 112, the overall system 10 may be pressurized for variations in altitude, temperature and product processing requirements.

In operation the vessel 16 and the system 10 of the present invention have been found to be effective in reducing energy consumption in the processing of particulate matter such as grain. The present system 10, utilizing both swirling and counter-swirling notional planes 147 and 226, respectively, disposed longitudinally along the vertical vessel 16 and created by the array of paddles and stators disposed therein, has substantially reduced the amount of energy required for temperature and moisturing conditioning of mash, a ground up grain mixture utilized for animal feed. In one test of the method and apparatus as described herein, 808,000 Btu's per hour were utilized for a mass flow rate of 11.56 tons per hour. The resultant energy consumption was established to be approximately 70,000 Btu's per ton of mash. This is a significant reduction over conventional processing consumption rates. Conventional processing consumption rates on the order of 210,000 Btu's per ton of mash are common for equivalent moisture and temperature conditioning treatment. For this reason it may be seen that the utilization of the method and apparatus of the present invention affords a great advantage over the prior art and greatly enhances energy savings. It should be noted that the counter-swirl mixing planes provided by the stators 224 disposed between the rotating paddles 104 greatly facilitate the homogenous interaction of the temperature and moisture treatment fluid 96 ascending through the vessel 16. As described above, the paddle and stator configuration prevents the undesirable confined channeling of the treatment fluid vapor through low pressure regions which would ordinarily be created in many prior art configurations. When vapor is allowed to channel upwardly without homogeneous interaction with the particulate matter, a great deal of energy is lost and more processing time is necessary for uniform treatment of the particulate matter. The present invention overcomes these problems of the prior art as herein described and therein provides a marked advantage for treatment of animal, mineral and/or vegetable matter in a vertical countercurrent flow configuration.

The technological advance over the prior art by the present system 10 is thus shown to include means for temperature and/or moisture conditioning of particulate matter of the animal, mineral or vegetable variety in a vertical counter-current flow configuration utilizing both swirling and counter-swirling rotational planes disposed longitudinally along the vessel. Unlike prior art systems, a series of homogeneous notional mixing planes 147, 226 are provided in the vessel 16 to facilitate the myriad of control parameters provided by the vapor generator unit 14 described above. Such conditioning lends feasibility to compression and extrusion of any particulate matter composition with a minimum of energy. Paddle rotation in the vertical mode with vapor generator flue gases actually occurs with reduced resistance due to the "fluffing" of particulate matter upwardly through the non-condensible gaseous regions congregating within the notional planes. It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

What is claimed is:

1. An improved system for the conditioning of particulate matter of the type wherein said particulate matter to be conditioned is exposed to treatment fluid within a vessel for select temperature and/or moisture level control, the improvement comprises:
   a vertical vessel having side walls;
   means for feeding particulate matter into an upper region of said vertical vessel for descending flow therethrough;
   means for discharging said particulate matter from a lower region of said vessel;
   means for injecting said treatment fluid into said vessel for mixture with said particulate matter; and
   means for maintaining a generally vertical homogeneous counter-current flow between said particulate matter and said treatment fluid, said means for maintaining said flow including a plurality of paddles adapted for rotation through said particulate matter and a plurality of stators disposed between certain ones of said paddles to establish a plurality of swirling and counter-swirling notional mixing planes longitudinally along said vertical vessel for facilitating homogeneous interaction between said treatment fluid and said particulate matter.

2. The system as set forth in claim 1 wherein said treatment fluid comprises a mixture of condensible and non-condensible gases and wherein said means for injecting said treatment fluid includes means for controlling the enthalpy, partial pressures and dew point of said mixture of condensible and non-condensible gases within said vessel.

3. The system as set forth in claim 2 wherein said means for injecting said treatment fluid comprises a vapor generator of the type wherein burning of fuel and oxidant is effected, said vapor generator including means for controlling the relative proportions of steam and non-condensibles issuing therefrom for control of said partial pressures within said vessel.

4. The system as set forth in claim 1 wherein said means for maintaining said flow further includes a generally vertical shaft with said paddles secured thereto, extending laterally therefrom and adapted for rotation through said particulate matter within said vessel, and wherein said stators are secured to said walls of said vessel, for extending therein between certain of said paddles.

5. The system as set forth in claim 4 wherein said paddles disposed in the lower and intermediate regions of said vessel are angulated for propelling particulate matter upwardly against the descending flow thereof to establish a homogeneous mixture with said treatment fluid therein and wherein said stators disposed between said paddles are angulated relative to a diameter of said vessel for engaging and propelling particulate matter toward the center of said vessel.

6. The system as set forth in claim 5 wherein at least one paddle secured to said shaft in an upper region of said vessel is angulated downwardly for propelling said particulate matter downwardly into said vessel.

7. The system as set forth in claim 1 wherein said means for injecting said treatment fluid into said vessel includes a discharge manifold coupled to a lower region of said vessel for discharging said treatment fluid into said lower region of said vessel for ascending flow therethrough counter-current to said descending flow of said particulate matter therein, said discharge manifold comprising a perforated bulkhead sealed within an outer cowling whereby an annular flow region is defined therearound.

8. The system as set forth in claim 1 wherein said means for feeding and discharging particulate matter into and from said vessel include airlock means for substantially sealing said generally vertical vessel to substantially prevent the venting of said treatment fluid therefrom.

9. An improved method for conditioning of particulate matter of the type wherein said particulate matter to be conditioned is exposed to treatment fluid within a vessel homogeneous for select temperature and/or moisture level control, wherein the improvement comprises the steps of:
   providing a vertical vessel for receipt of particulate matter and treatment fluid therein;
   feeding particulate matter into an upper region of said vertical vessel;

permitting said particulate matter to descend through said vertical vessel;

discharging said particulate matter from a lower region of said vessel;

injecting said treatment fluid into said vessel;

mixing said treatment fluid with said particulate matter within said vessel;

providing a plurality of paddles disposed within said vessel;

providing a plurality of stators disposed between certain ones of said paddles;

rotating said paddles through said descending particulate matter in said vessel, swirling said particulate matter with said paddles, and establishing a plurality of notional mixing planes therein;

blocking and swirling matter from certain ones of said paddles and propelling said matter toward the center of said vessel; and maintaining a generally vertical homogenous counter-current flow between said particulate matter and said treatment fluid through said notional mixing planes defined by said paddles.

10. An improved grain treatment system for conditioning grain and microingredients thereof with heat and moisture prior to pelletization, wherein a vessel is provided and includes means for the feeding of grain therein, the passage of grain therethrough, discharge of grain therefrom and having means for injecting steam therein to heat and moisturize grain and microingredients within said vessel, wherein the improvement comprises a generally vertically disposed processing vessel having side walls adapted for controlled vertical descent of grain therethrough, means for injecting the steam into said vessel for counter-current ascending flow therethrough and the homogeneous mixing therein of said grain and steam for generally uniform time periods, means for maintaining a generally vertical homogeneous counter-current flow between said grain and steam, said means for maintaining said flow including a generally vertical shaft and a plurality of paddles secured thereto and extending laterally therefrom for rotation through said grain and a plurality of stators disposed between certain ones of said paddles to establish notional mixture planes of homogeneous grain and steam and means for sealing said generally vertical vessel to substantially prevent the discharge of steam therefrom.

11. The apparatus is the system as set forth in claim 10 wherein said sealing means includes a grain feed airlock system disposes atop said vessel for feeding grain therein and preventing the escape of steam therefrom.

12. The system as set forth in claim 10 wherein said sealing means further includes a grain discharge airlock for permitting the controlled discharge of grain from said vessel while substantially maintaining the presence of steam pressure therein.

13. The system as set forth in claim 10 wherein said vessel further comprises a surge bin coupled in flow communication to an upper region thereof adapted for receiving and containing a preselect supply of grain flowing into said vessel.

14. A system as set forth in claim 13 wherein said surge bin further includes grain level indicating means for controlling the volume of grain stored therein and said grain treatment system includes central means for maintaining said grain level.

15. The system as set forth in claim 14 wherein said surge bin is further constructed with a lower necked region in flow communication with said vessel for providing a choke feed for the supply of grain entering said vessel.

16. A system as set forth in claim 10 wherein said paddles further comprise a plurality of blades having angulated surfaces relative to said axis of rotation, said paddles disposed in the lower and intermediate regions of said vessel being angulated for swirling and propelling grain particles upwardly against the descending flow thereof to establish swirling homogeneous mixture planes and eliminating predefined vapor flow paths therethrough, and at least one paddle secured so said shaft in an upper region of said vessel being angulated downwardly for propelling grain and microingredients and mixture therewith downwardly into said grain flow for maintaining the homogeneity of said grain steam interaction.

17. The system as set forth in claim 16 wherein said stators are secured to walls of said vessel extending therein between certain ones of said paddles for blocking sections of said swirling of grain from said paddles and establishing counter-swirling grain mixture planes between said swirling mixing planes.

18. The system as set forth in claim 17 wherein said stators disposed between said paddles are angulated relative to a diameter of said vessel passing therethrough for engaging and propelling swirling grain toward the center of said vessel to further eliminate predefined vapor flow paths therethrough.

19. The system as set forth in claim 18 wherein said stators are demountably secured to said walls of said vessel, extending therein in generally parallel spaced relationship between certain ones of said paddles and being adapted for removal therefrom for facilitating the assembly of said system.

20. The system as set forth in claim 10 wherein said steam injection means further includes a vapor generator for producing steam and non-condensible gases for injection to said vessel for the heating and moisturizing of said grain, said vessel further including means for venting non-condensible gases from said vessel.

21. The system as set forth claim 20 above wherein said venting means for non-condensible gases includes a centrifugal particle/vapor separating system coupled at a first point in flow communication to an upper region of said vessel for receiving non-condensible gases and grain particles therefrom and at a second point to said grain feed means for discharging grain and particulate matter collected from said upper region of said vessel during the operation thereof.

* * * * *